Oct. 29, 1946.     D. O. BRANT     2,410,010
MILK STRAINER
Filed Nov. 15, 1943

David O. Brant,
INVENTOR.
BY
ATTORNEY.

Patented Oct. 29, 1946

2,410,010

UNITED STATES PATENT OFFICE 2,410,010

MILK STRAINER

David O. Brant, Beverly Hills, Calif.

Application November 15, 1943, Serial No. 510,359

12 Claims. (Cl. 210—159)

The present invention relates to improvements in milk straining apparatus though not limited to straining milk entirely.

Some of the more important objects of the invention comprise:

To provide improved means for faster straining operations and for more quickly putting the strainer into maximum operation; to provide improved means for eliminating back pressure from the can into which the milk is being strained; to provide improved means for regulating the rate of flow and thereby control the quantity of milk passing through the strainer at a given time; to provide improved means for protecting the filter-pad material being used and for economizing on the quantity of filter-pad material employed for such purposes; to provide improved means for single or double straining operations as desired; to provide improved means for eliminating air pockets under the splash dome, thereby accelerating the priming operation and rate of flow of the milk passing through the strainer; and to provide improved means for distributing the weight of the milk in such a manner whereby the filter medium is permitted to float free in the milk rather than be in a strain of tension, especially throughout the early stages of the straining operation, principally due to the fact that the sediment is not pressed into the cotton fabric until the latter is nearly clogged, thus permitting the milk to pass unimpeded therethrough.

Figure 1:
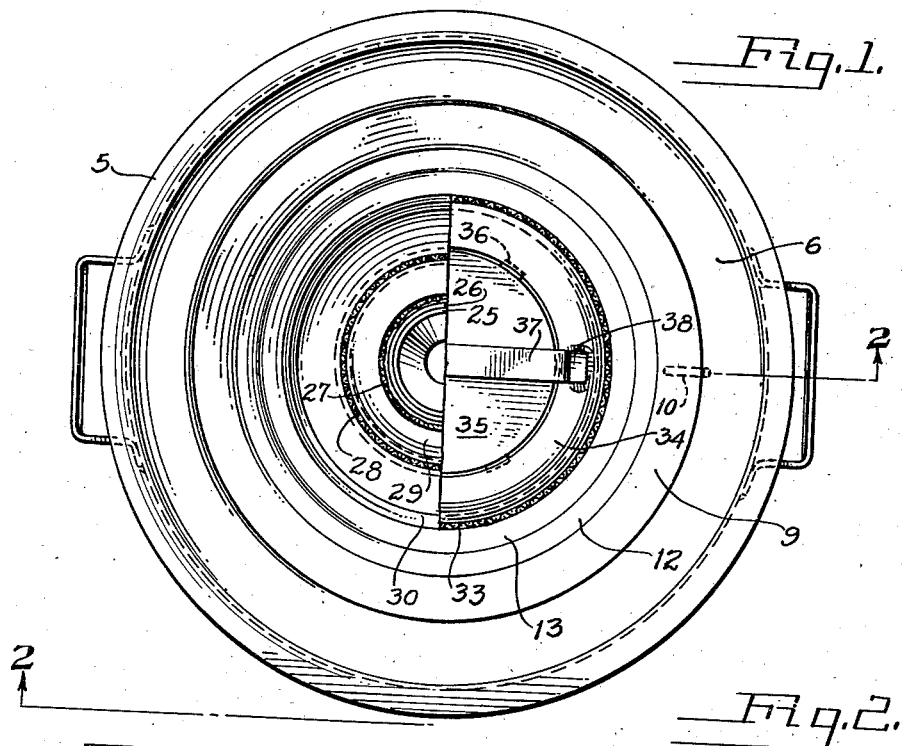

Referring to the accompanying drawing, wherein is shown a preferred embodiment of the invention, Fig. 1 is a combination plan and sectional view of the device taken at different elevations.

Figure 2:
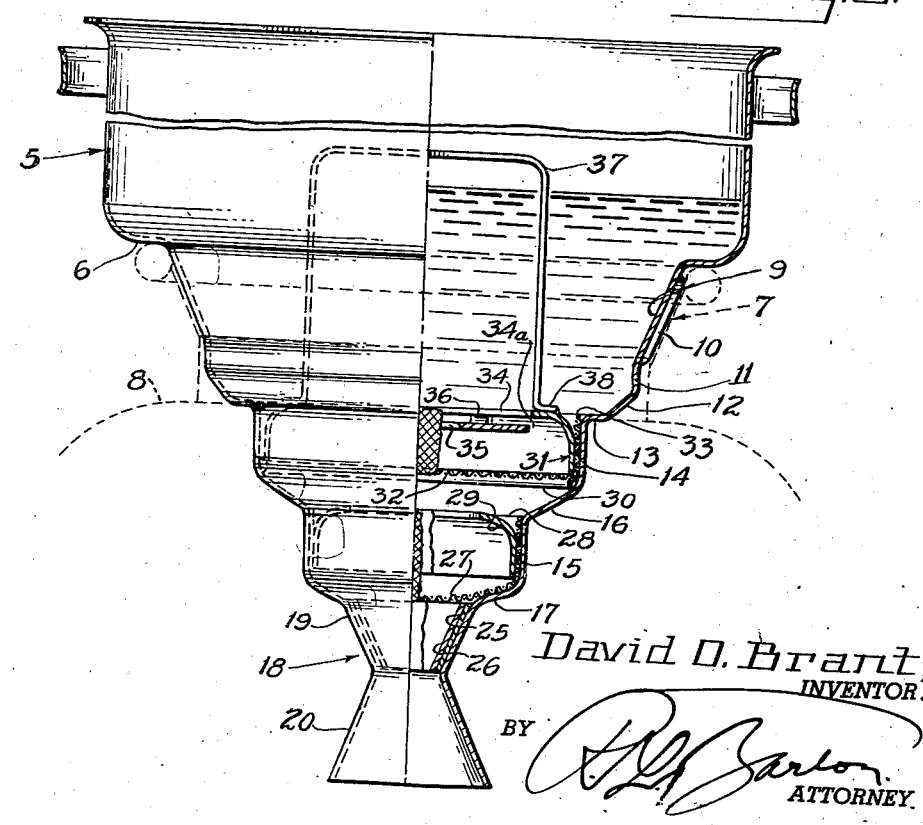

Fig. 2 is a sectional-elevational view, the plane of section and elevation being indicated by line 2—2 on Fig. 1, some portions being broken away to show underlying structures.

Referring in detail to the drawing, the strainer tank 5 is circular as viewed in plan and is of a stepped formation, being diametrically contracted at spaced intervals, thereby decreasing its internal diameter by downward stages. One of these steps provides at the lower end of the main body portion of the tank an annular downwardly facing shoulder 6 to rest upon the flared mouth portion 7 of the milk can 8. Below said shoulder 6 the tank 5 has a frusto-conical portion 9 which fits within the aforesaid flared mouth portion 7 of the conventional milk can shown. This frusto-conical part is provided with, at least one external projection, shown as a small upwardly and downwardly extending rib 10, to provide an air outlet space between the strainer and the can.

By preference and as shown, a short section 11 of the strainer tank wall immediately below said frusto-conical portion 9 is cylindrical, the tank wall immediately below this section being inwardly inclined, or tapered, at 12 down to an annular ledge 13 which further contracts the diameter of the tank. Below said ledge the tank has a cylindrical upper strainer-containing section 14 and still farther down a cylindrical, lower strainer-containing section 15 of yet small-diameter, there being an annular inclined, preferably slightly concave or dished wall portion 16 intervening between these two cylindrical sections.

Said strainer-containing section 15 has a slightly dished bottom 17 from the center of which leads a venturi spout 18, the upper section 19 of said spout being shown as about one half as long as the lower section 20 thereof.

The venturi spout 18 may be made of a somewhat pliable metal so that it can be deformed thereby regulating the size of the outlet through it; but a preferred means to accomplish this purpose is to provide one or more removable, frusto-conical reducer members, two such members 25 and 26 being shown, the member 25 fitting within the upper venturi tube section 19 and the member 26 being fitted within said member 25. It will be seen that by using one, both or neither of the detached spout members 25 and 26 three different sizes of outlet may be selectively afforded for the milk outlet. Said members 25 and 26 may be described as lining members for the upper portion of the venturi spout.

A lower strainer cloth 27 is shown overlying the bottom 17 and outlet therefrom, said cloth having an upwardly directed edge portion 28 which is gripped between the strainer wall 15 and the side portion of a retaining ring 29, shaped as an open-topped dome.

At the juncture of the cylindrical wall section 14 with the dished section 16 the strainer body has soldered or otherwise secured within it a non-liquid restricting ringlike member 30 which forms an abutment or rest for a member 31 which holds in place an upper strainer cloth 32 or sheet of fabric having an upwardly directed edge portion 33 which is gripped between said member 31 and the surrounding cylindrical tank wall section 14, said member 31 also pressing upon the part of the fabric sheet 32 which overlies the ring 30. Said member 31 is shown as a circular sheet or ring which is somewhat dome shaped and yet having a flat central area, which has a spacious circular top opening 34 guarded in it by a circular splash plate 35 shown as being of the same diameter as said opening and spaced slightly therebelow, thus leaving an annular milk-admission space 34a.

The splash plate 35 is shown supported by a plurality of ears or narrow webs 36, and an advantage is obtainable by making the plate of the same diameter as the opening 34, for the body portion of the member 31 may then be stamped out of a suitable sheet material and the plate 35 together with its supporting ears 36 be formed at the same stamping operation. In order to facilitate its insertion and removal it is desirable that the member 31 be furnished with a handle 37, which is shown shaped as an inverted, rectangular U, the arms of which have outwardly deflected end portions 38 which are soldered or otherwise secured to the top of diametrically opposite side portions of the member 31.

The upper strainer cloth retaining member 31 and also the lower cloth retaining member 29 may be made of glass or plastic, as they have no parts too small or delicate to be thus constructed, but it may be found more practicable to make in a separate piece the handle 37 of the member 31 and to attach said handle in the manner already stated.

If desired, a third strainer cloth retaining member may be furnished shaped the same as the one which holds in place the cloth 32 but of a sufficiently small diameter to be substituted for the lower cloth retaining member 29. When the straining is all done by said lower cloth, either such third member should be supplied or else the upper member 31 should be used without the cloth 32. Otherwise no splash plate will be present to prevent direct impact of the milk against the strainer cloth 27.

In the operation of the strainer for double straining the parts are assembled as shown in Fig. 2, except that the frusto-conical reducers 25 and 26 will not be used unless a slower, more thorough straining operation is desired. This slowing up of the straining operation is only necessary when the milk is delivered to a cooler the capacity of which is not sufficient properly to take care of the fifteen per cent increase of milk delivery resulting from the use of the venturi spout.

The strainer can be used in two sizes as a single strainer. For smaller dairies a member holding in place the lower strainer cloth would suffice, effecting a saving in filter-pad material used. For straining larger quantities in a given time the upper cloth and its retaining member can be used alone, or in combination with the lower strainer, for double straining.

An important feature of the invention resides in the construction of the two dome shaped members 29 and 31 which protect the cloth (preferably cotton) disks from the splash of the milk, which might otherwise rupture them and let foreign substances through. Said members 29 and 31 may each be made of a single piece of metal or other suitable material such as glass, or plastic pressed into inverted cup shape with the upper part of the side wall curving inwardly. In the case of the upper member 31 the bottom (top when in operative position) is impressed leaving the narrow, milk-admission slits 34a positioned as already stated.

With the parts assembled as shown in Fig. 2, when the milk is poured in its fall is broken by the splash or baffle plate 35, the milk being directed laterally through the slits 34a and in a radial direction in relation to the axis of the device, so that the force of the stream is directed against the upper part of the inside wall surface of the upper member 31. This breaks the force of the stream and prevents an injurious washing of the underlying strainer disk 32. The milk thus admitted falls onto the strainer cloth 32 and quickly fills the shallow space under the dome shaped member 31, after which it flows very gently over said cloth, preventing an injurious washing action thereon. Also, shaping the dome shaped strainer cloth retaining members as has been described completely eliminates the formation of air pockets under said members, which have often prevented proper priming and flow through strainers as heretofore constructed.

When the apparatus is used for double straining, the lower strainer cloth retaining member need not have a baffle plate or handle, as the upper cloth retaining member breaks the splash, and the operator's fingers can be inserted under the rim portion of the upper part of the lower member 29 when lifting it out; but when said members are used singly they both require a handle to use in removing them after use, for cleaning. The baffle plates may be made of transparent material to enable the operator to see that the strainer cloths are properly positioned, or to observe the rate of flow under the baffle plate when tests are made by using transparent water.

The use of the venturi spout accelerates the flow of the milk, but tests made by using water having enough solid material in it to flow at the average rate of milk show that the additional quantity of milk strained by this device for a given time is largely due to the fact that the strainer capacity of the cloth disks is greater than the discharge capacity of the outlet portion of the strainer; so that, instead of the weight of the liquid being borne by the strainer cloths and causing their fibers to be compressed and consequently more easily clogged, the weight of the liquid is borne by the discharge portion of the strainer and the strainer cloths are caused to float freely in the liquid. Furthermore, the sediment is not pressed into the fabric, and until a considerable quantity of sediment is present there is no appreciable retarding of the flow of the milk through the strainer.

What is claimed is:

1. In a strainer, a tank having an interior ledge extending therearound in a downwardly spaced relation to its top and provided with an outlet in its bottom portion, a sheet of strainer fabric overlying the space surrounded by said ledge and having portions resting thereon, and a retaining member for said sheet, said member being shaped as a ring somewhat dome shaped and positioned with its mouth portion abutting against the part of said sheet which overlies said ledge, said retaining member having a spacious central opening through its top, a baffle underlying said opening, said ledge being spaced below the top of the tank at such a distance that said baffle does not extend above the tank, and supporting ears for said baffle plate extending from edge portions of said opening.

2. The subject matter of claim 1, and said ring, baffle plate and ears consisting of a unitary piece of sheet metal.

3. The subject matter of claim 1, and the diameter of said baffle plate being substantially the same as the diameter of said opening and the edges of said opening and baffle plate being substantially in the same vertical plane.

4. As an article of manufacture, a strainer cloth retaining member consisting of a dome shaped ring member having a spacious central opening through its top, a baffle plate of substantially the same size and shape as said opening, and means whereby said baffle plate is supported by said ring member in a parallel and slightly inwardly spaced relation to said spacious opening.

5. The subject matter of claim 4, and the supporting means for said baffle plate consisting of ears uniting at intervals edge portions of said baffle plate with edge portions of said opening.

6. In a strainer, a tank having a stepped formation decreasing its internal diameter by downward stages, a strainer fabric of sheet material overlying one of the steps of said stepped formation together with the space therewithin, a strainer fabric retaining member comprising a ring somewhat dome shaped having a spacious milk-admission opening in its top and carrying a baffle plate supported by said ring between said opening and said strainer fabric to deflect the milk horizontally as its passes from said opening to said fabric, and a venturi milk outlet spout carried by the lower end portion of said tank.

7. In a strainer, a tank having a stepped formation decreasing its internal diameter by downward stages, a strainer fabric of sheet material overlying one of the steps of said stepped formation together with the space therewithin, a strainer fabric retaining member having a spacious milk-admission opening in its top and carrying a baffle plate supported by said ring between said opening and said strainer fabric to deflect the milk horizontally as it passes from said opening to said fabric, a venturi milk outlet spout carried by the lower end portion of said tank, and said tank having a ledge-forming step intermediate said venturi spout and the step which supports said strainer fabric, a strainer cloth supported by said intermediate step, and a retainer member for said cloth in an overlying relation thereto.

8. The subject matter of claim 7, and said retainer member consisting of a ring somewhat dome shaped.

9. The subject matter of claim 1, and a venturi milk outlet spout carried by the lower end portion of said tank.

10. In a strainer structure, a tank having a cylindrical wall portion, a ring extending internally around said wall and secured thereto, a sheet of strainer fabric overlying said ring and having edge portions directed upwardly therefrom, a circular retaining member fitted within said upwardly directed edge portions of said fabric sheet to grip them between it and the surrounding wall portion of the tank, and a venturi milk outlet spout carried by the lower end portion of said tank, said tank having a ledge-forming step intermediate said venturi spout and the ring which supports said strainer fabric, a strainer cloth supported by said intermediate step, and a retainer member for said cloth in an overlying relation thereto.

11. In a strainer, a tank having a stepped formation decreasing its internal diameter by downward stages and provided with an outlet in its bottom portion, a strainer fabric sheet overlying one of the steps of said stepped formation together with the space therewithin, a strainer fabric retaining member comprising a ring somewhat dome shaped provided with a handle and having a cylindrical rim to clamp the cloth around its edges over the outlet, there being an opening in the top flat area of said ring, and baffle means carried by the ring to deflect the milk horizontally as it passes from said opening to said fabric, said baffle being located superjacent said fabric and subjacent said opening.

12. As an article of manufacture, a strainer cloth retaining member consisting of a ring member provided with a somewhat dome shaped top having a flat central area, handle means secured to said flat central area, there being an opening in said flat central area, and baffle means carried by said ring member to direct the milk radially outward after it passes through said opening, said baffle means being located below said opening and above the edge of the rim of the ring whereby to provide an open space directed toward and facing the ring portion of said member.

DAVID O. BRANT.